Dec. 21, 1926.　　　　　　　　　　　1,611,459
S. P. KHATUNZEFF
DIFFERENTIAL TRANSMISSION
Filed June 10 1925　　2 Sheets-Sheet 2
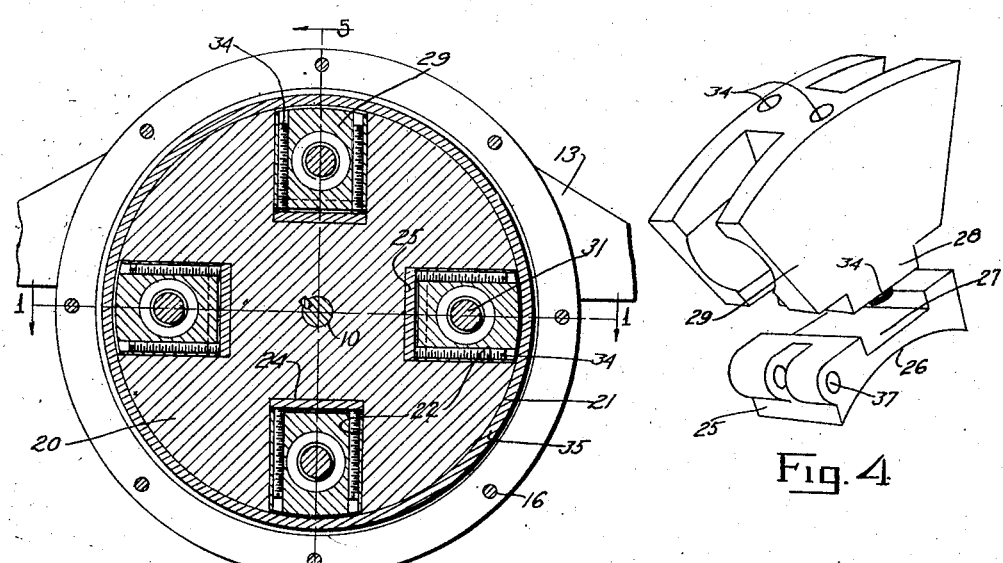
Fig. 2
Fig. 4
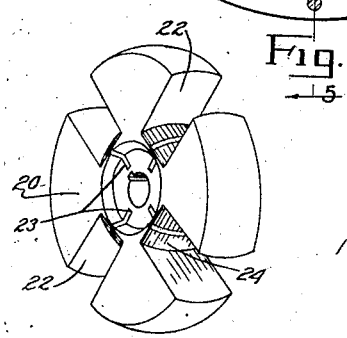
Fig. 3
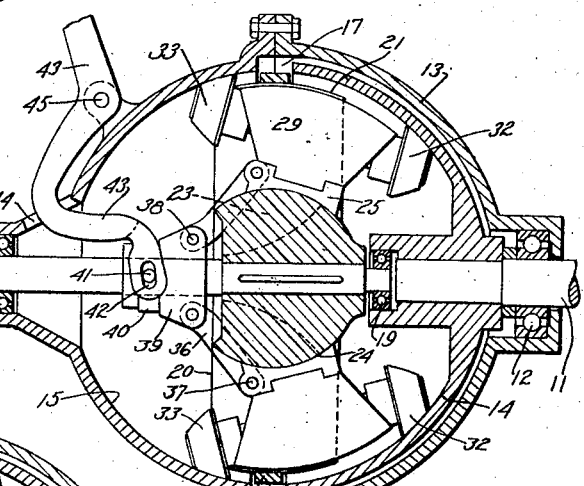
Fig. 5
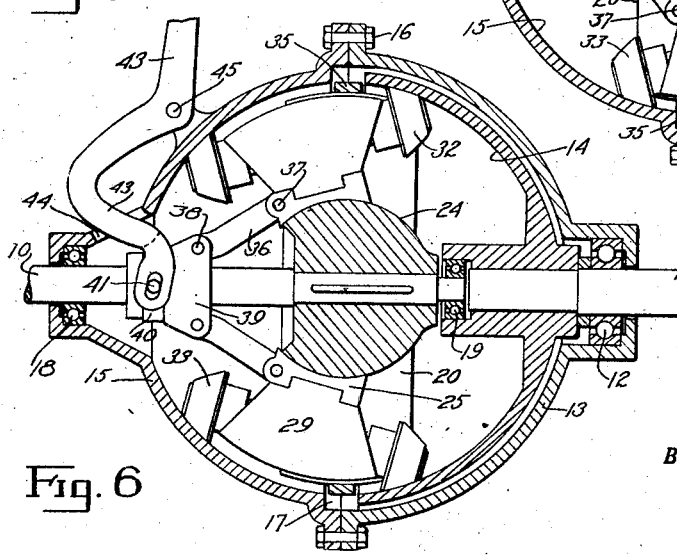
Fig. 6
INVENTOR.
Sergius P. Khatunzeff
BY
S. H. Braddock
ATTORNEY.

Patented Dec. 21, 1926.

1,611,459

UNITED STATES PATENT OFFICE.

SERGIUS P. KHATUNZEFF, OF BRIDGEPORT, CONNECTICUT.

DIFFERENTIAL TRANSMISSION.

Application filed June 10, 1925. Serial No. 36,171.

This invention relates to differential transmissions, and an object of the invention is to produce a differential transmitting mechanism which will combine the functions of a clutch and of variable transmitting devices without change of impact between a driving member and a member to be driven at any speed or in either direction, and to provide in the transmitting mechanism an arrangement of inner and outer spherical friction devices adapted to always engage each other along a line which is in a plane passing through the axis of both of said members, whereby a surface engagement between said inner and outer spherical friction devices is approached.

A further object is to produce a differential transmitting mechanism as stated, which will include a driving member, a driven member, a frame rotatable with one of said members and having at least one freely rotatable shaft with spaced apart spherical friction rollers fixed thereon, a hollow, fixed hemi-sphere always engaged by one of said spherical friction rollers on a line on its inner surface which is in a plane passing through the axis of said members, a hollow hemi-sphere rotatable with the other of said members and always engaged by the other of said spherical friction rollers on a line on its inner surface also in a plane passing through the axis of said members, and means for shifting, as a unit, said spherical friction rollers axially of both of said hemi-spheres, whereby the driven member can be propelled by the driving member at any desired speed or in either direction, or the driving member can rotate while the driven member is stationary.

A still further object is to provide in the differential transmitting mechanism an arrangement for adjusting the spherical friction rollers toward and away from the adjacent surfaces of the hemi-spheres in order to obtain a desired and predetermined frictional engagement between rollers and hemi-spheres, and to so mount the carrier (or carriers) for said rollers with respect to said hemi-spheres and to so associate the shaft (or shafts) having said rollers with said carrier (or carriers) that the pressure against the surface of each hemi-sphere of the spaced apart rollers upon a shaft will at all times be equal.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

In the accompanying drawing forming a part of this specification,

Fig. 2 is a transverse sectional view thereof, on a reduced scale, taken as on line 2—2 in Fig. 1;

Fig. 3 is a perspective view of the fly wheel, on a still smaller scale, removed from the mechanism;

Fig. 4 is a perspective view of a friction roller carrier and a saddle therefor, showing the carrier removed from the saddle, to better disclose the arrangement for adjusting the friction rollers toward and away from the adjacent surfaces of the hemi-spheres;

Figs. 5 and 6 are sectional views taken as on line 5—5 in Fig. 2, the former disclosing a driving and a driven shaft which will move in opposite directions, and the latter disclosing a driving and a driven shaft which will move in the same direction; and Fig. 7 is a sectional view of a variant form of friction roller and carrier and shaft therefor.

Figure 1:
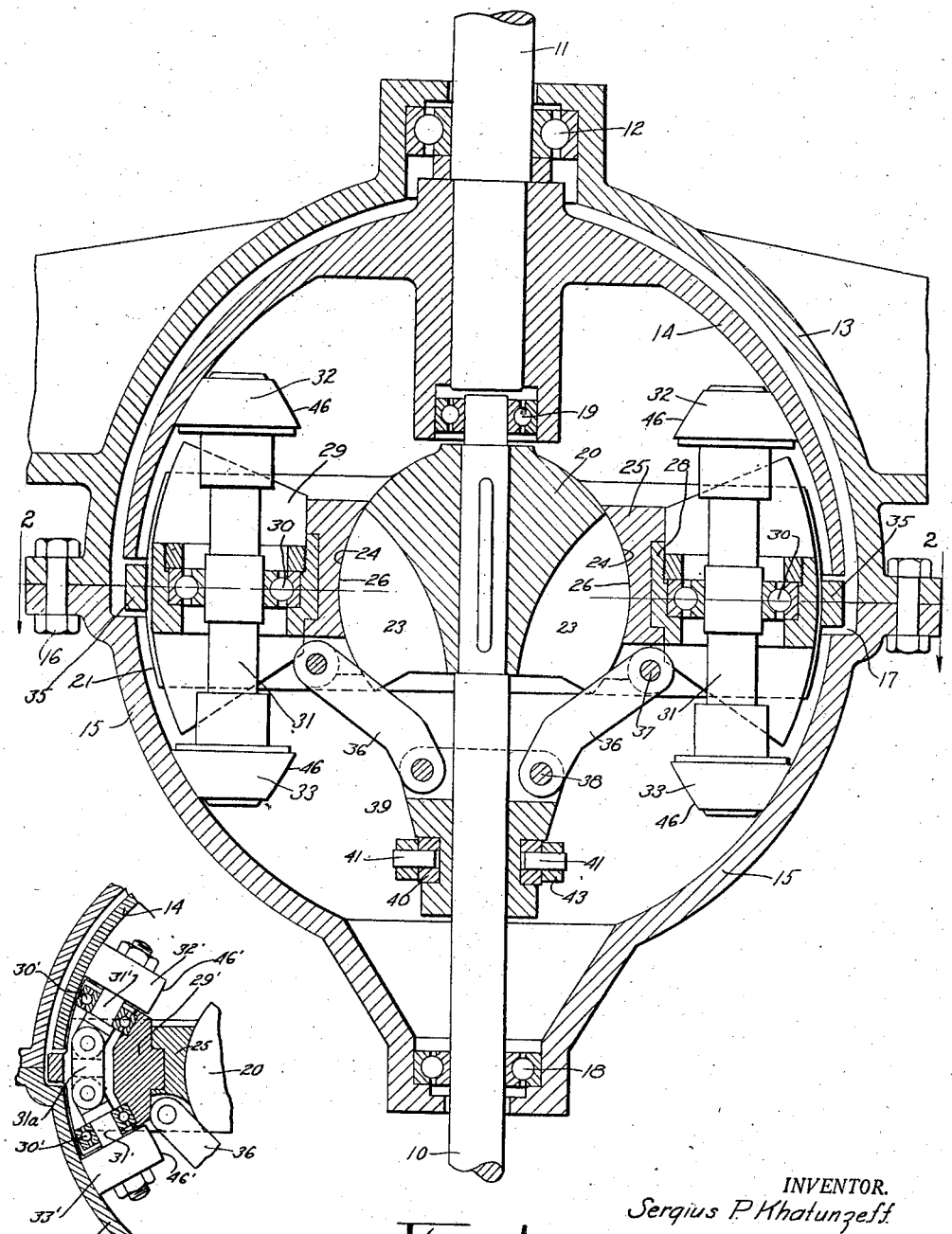
Fig. 1 is a horizontal sectional view of a transmission mechanism having the features of the invention, taken as on line 1—1 in Fig. 2.

With respect to the drawings, let 10 be a driving shaft adapted to be rotated in any convenient manner, and 11 be a shaft to be driven at any speed or in either direction by power transmitted to the shaft 10. The driven shaft 11 is mounted, as at 12, in a fixed member 13 of a housing for the movable parts of the transmitting mechanism and rigidly carries a hemi-sphere 14 rotatable in said housing. Numeral 15 denotes a hemi-sphere secured to the member 13, as at 16, and providing with the hemi-sphere 14 a sphere one half of which is fixed and the other half of which is rotatable. In practice, there will be a space 17 between the adjacent edges of the hemi-spheres 14 and 15. The driving shaft 10 is mounted, as at 18, in the hemi-sphere 15, and is mounted, as at 19, in an extension of the hemi-sphere 14, in such manner that the shafts 10 and 11 are in alignment and are arranged centrally of the sphere consisting of the hemi-spheres 14 and 15, at right-angles to the marginal edge of each hemisphere.

Numeral 20 represents a fly wheel fixed upon the shaft 10 at right-angles to said shaft and also arranged centrally of the sphere, the periphery 21 of the fly wheel being adapted to lie close to the outer margins of the hemi-spheres and desirably being spherical to better clear both of said hemispheres.

The fly wheel 20 is of the peculiar construction more clearly disclosed in Fig. 3, it including spaced apart, radial ways 22, parallel with the shaft 10, for the friction roller carriers and their saddles, and slots 23 at the bases of the ways, and also parallel with the shaft 10, for links for manipulating the saddles and roller carriers. There is a way 22 and a slot 23 for each set of friction rollers to be employed in the mechanism, it being understood that there can be a greater or less number than four as disclosed.

The base of each way 22 and the surfaces of the fly wheel adjacent each way includes a cylindrical surface 24 concentric with the portions of the surfaces of the hemi-spheres 14 and 15 spaced from the sphere axis. Each saddle, denoted 25, has an inner surface 26 to nicely fit and rotate over a cylindrical surface 24, and an outer surface provided with a groove 27 to receive a tongue 28 upon a friction roller carrier 29. Each carrier 29 includes a bearing 30 for a shaft 31 upon the opposite ends of which friction rollers 32, 33 are fixed, the rollers 32 being adapted to engage the inner surface of the hemi-sphere 14 along lines each in a plane passing through the axis of the transmitting mechanism, and the rollers 33 being adapted to engage the inner surface of the hemi-sphere 15, also along lines each in a plane passing through the axis of said mechanism. Screws 34 in each carrier 29 and engaging the base of the groove 27 are for the purpose of moving the carriers outwardly from their saddles, to adjust the pressure with which the friction rollers engage the hemi-spheres. See Fig. 4. 35 is a band about the fly wheel and in the space 17 between the hemispheres.

Numeral 36 represents links which at times enter the slots 23 already mentioned, the inner ends of the links being pivoted upon the saddle as at 37 and the outer ends thereof being pivoted, as at 38, upon a yoke 39 slidable upon the shaft 10. 40 is a ring about the yoke and having pins 41 engaging short slots 42 upon the inner end of a manipulating lever 43 passing through a slot 44 in the hemi-sphere 15 and pivoted as at 45 to the outer surface of said hemi-sphere, the lever, clearly, being for the purpose of rotating the saddles 25 upon the cylindrical surfaces 24 of the fly wheel.

The outer surfaces 46 of the friction rollers are, naturally, spherical to better fit the inner surfaces of the hemi-spheres. In Figs. 1 to 6 said friction rollers are spherical-cones. In Fig. 7 a modification of the friction rollers is disclosed. Here, the idea is to provide friction rollers 32′, 33′ which are more in the nature of spherical-cylinders whose outer faces are indicated 46′; that is to say, friction rollers of diameter close to uniform for their whole lengths. To this end, the friction roller carrier 29′ has two bearings 30′ for the shaft 31′ including a double universal joint 31ᵃ.

It will be obvious that when the friction rollers are in their positions of Figs. 1 and 7 (with each roller 32, 33, and 32′, 33′, having rolling contact of the same diameter), rotation of the shaft 10 will cause rotation of each roller 33 or 33′ over the hemi-sphere 15 at the same speed and in the same direction as rotation of the roller 32 or 32′ over the hemi-sphere 14, without producing rotation of the shaft 11. A shifting of the friction roller carriers to the right, as in Fig. 5, will set up in the shaft 11 a rotation in reverse direction to the rotation of the shaft 10, for the reason that the roller 33 will rotate over a larger diameter than the roller 32. A shifting of the friction roller carriers to the left, as in Fig. 6, will set up in the shaft 11 a rotation in the same direction as the rotation of the shaft 10, for the reason that the roller 33 will rotate over a smaller diameter than the roller 32. The amount of the shifting of the rollers from their normal positions as in Figs. 1 and 7, will, of course, determine the rate of speed at which the shafts rotate relatively to each other, the speed of the driven shaft increasing from zero to the speed of the driving shaft as the rollers are shifted from their neutral position to their extreme positions as indicated in Figs. 5 and 6. Clearly, the shaft 11 could be the driving shaft and the shaft 10 the driven shaft.

It will be evident that centrifugal force will aid the frictional engagement between the friction rollers and the hemi-spheres 14 and 15, and that the pressure against the surface of each hemi-sphere by the spaced apart rollers can at all times be equal. It will also be evident that the present mechanism has provision whereby inner and outer spherical friction devices engage each other along lines which are in a plane passing through the axis of the mechanism to obtain an engagement between said inner and outer spherical friction devices approaching a surface engagement.

Having thus fully described the invention, what I claim as new and desire to secure by Letters Patent is:

1. A transmitting mechanism comprising a fixed spherical surface, a rotatable spherical surface, a rotatable shaft, a carrier upon said shaft and rotatable therewith, shaft means rotatable in said carrier, friction rollers fixed to said shaft means and including a friction roller engaging said fixed spherical surface and a friction roller engaging said rotatable spherical surface, and means for adjusting said carrier to shift said friction rollers, as a unit, axially of both of said spherical surfaces.

2. A transmitting mechanism comprising a driving member, a member to be driven, a frame rotatable with one of said members and having a rotatable shaft with friction rollers fixed thereon, a fixed surface engaged by one of said friction rollers, a surface rotatable with the other of said members and engaged by another of said friction rollers, the surfaces being concave and the rollers convex, and all of the surfaces and rollers having spherical engaging faces allowing a line engagement approaching a surface engagement between each surface and a roller, and means for shifting said friction rollers axially of said surfaces.

3. A transmitting mechanism comprising a fixed surface, a rotatable surface, a rotatable shaft, a friction roller carrier fixed to rotate with said shaft and itself movable in an arc and longitudinally of said shaft, shaft means rotatable in said carrier, friction rollers fixed to said shaft means and including a friction roller engaging said fixed surface and a friction roller engaging said rotatable surface, and means for imparting movement to said carrier longitudinally of said shaft.

4. A transmitting mechanism comprising a fixed spherical surface, a rotatable spherical surface, a rotatable shaft, a friction roller carrier fixed to rotate with said shaft and itself movable in an arc and longitudinally of said shaft, shaft means rotatable in said carrier, and friction rollers fixed to said shaft means and including a friction roller engaging said fixed spherical surface and a friction roller engaging said rotatable spherical surface.

5. A transmitting mechanism comprising a fixed spherical surface, a rotatable spherical surface, a rotatable shaft having a radial way parallel therewith, the base of which way includes a cylindrical surface concentric with one of said spherical surfaces, a friction roller carrier rotatable upon said cylindrical surface and fixed to rotate with said shaft, shaft means rotatable in said carrier, and friction rollers fixed to said shaft means and including a friction roller engaging said rotatable spherical surface and a friction roller engaging said fixed spherical surface.

6. A transmitting mechanism comprising a fixed surface, a rotatable surface, a rotatable shaft having a radial way, the base of which way includes a cylindrical surface, a friction roller carrier rotatable upon said cylindrical surface and fixed to rotate with said shaft, shaft means rotatable in said carrier, friction rollers fixed to said shaft means and including a friction roller engaging said fixed surface and a friction roller engaging said rotatable surface, and means for rotating said carrier upon said cylindrical surface to shift said friction rollers, as a unit, axially of said fixed surface and said rotatable surface.

7. In a transmitting mechanism, a fixed hemi-sphere, a rotatable hemi-sphere, said hemi-spheres together in effect comprising a sphere, a shaft mounted in said sphere, a fly wheel fixed on the shaft and having a radial way parallel with said shaft, the base of the way including a cylindrical surface concentric with said sphere, a friction roller carrier rotatable upon said cylindrical surface, shaft means rotatable in said carrier, and friction rollers fixed to said shaft means, one of said rollers engaging said fixed hemi-sphere and the other of said rollers engaging said rotatable hemi-sphere.

8. In a transmitting mechanism, a fixed hemi-sphere, a rotatable hemi-sphere, said hemi-spheres together in effect comprising a sphere, a shaft mounted in said sphere, a fly wheel fixed on the shaft and having a radial way parallel with said shaft, the base of the way including a cylindrical surface concentric with said sphere, a friction roller carrier rotatable upon said cylindrical surface, shaft means rotatable in said carrier, friction rollers fixed to said shaft means, one of said rollers engaging said fixed hemi-sphere and the other of said rollers engaging said rotatable hemi-sphere, and means for rotating said carrier upon said cylindrical surface to shift said friction rollers, as a unit, axially of both of said hemi-spheres.

Signed at Bridgeport, in the county of Fairfield, and State of Connecticut, this 8 day of June, A. D., 1925.

SERGIUS P. KHATUNZEFF.